United States Patent
Bidner et al.

(10) Patent No.: US 9,291,256 B2
(45) Date of Patent: Mar. 22, 2016

(54) METHOD FOR PREHEATING A POWERTRAIN

(71) Applicant: Ford Global Technologies, LLC, Dearborn, MI (US)

(72) Inventors: David Karl Bidner, Livonia, MI (US); Amey Y. Karnik, Ann Arbor, MI (US); Jeffrey Allen Doering, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 73 days.

(21) Appl. No.: 14/223,870

(22) Filed: Mar. 24, 2014

(65) Prior Publication Data

US 2015/0267801 A1    Sep. 24, 2015

(51) Int. Cl.
*F16H 57/04* (2010.01)
(52) U.S. Cl.
CPC .................. *F16H 57/0417* (2013.01)
(58) Field of Classification Search
CPC ...... B60H 1/00314; B60H 1/02; B02N 19/10; F02D 2200/503; F02D 2200/023; F16H 57/0417
USPC ..................... 701/2, 51; 237/2 A, 12.3 R, 28; 122/41.01, 41.02; 165/51, 202, 43
See application file for complete search history.

(56) References Cited

U.S. PATENT DOCUMENTS

| | | | |
|---|---|---|---|
| 6,779,737 B2 | 8/2004 | Murray et al. | |
| 6,807,820 B2 * | 10/2004 | Aikawa et al. | 62/238.3 |
| 6,810,977 B2 | 11/2004 | Suzuki | |
| 6,874,695 B2 | 4/2005 | Baker et al. | |
| 8,403,811 B2 | 3/2013 | Ulrey et al. | |
| 8,410,401 B2 | 4/2013 | Thomas et al. | |
| 8,528,832 B2 | 9/2013 | Williams et al. | |
| 2011/0290895 A1 | 12/2011 | Yin | |
| 2012/0269625 A1 | 10/2012 | Sabhapathy | |
| 2013/0211623 A1 | 8/2013 | Thompson et al. | |
| 2013/0255604 A1 * | 10/2013 | Rollinger et al. | 123/41.15 |
| 2015/0165871 A1 * | 6/2015 | Miller et al. | 237/28 |

OTHER PUBLICATIONS

Will, F. et al., "A New Method to Warm Up Lubricating Oil to Improve the Fuel Efficiency During Cold Start," SAE International Paper No. 2011-01-0318, Published Apr. 12, 2011, 13 pages.

Bidner, David K. et al., "Method for Preventing Condensation on Vehicle Windows," U.S. Appl. No. 14/223,891, filed Mar. 24, 2014, 36 pages.

* cited by examiner

*Primary Examiner* — Marthe Marc-Coleman
(74) *Attorney, Agent, or Firm* — Julia Voutyras; Alleman Hall McCoy Russell & Tuttle LLP (57) ABSTRACT

Methods and systems are described for heating a powertrain prior to an engine start. One method includes heating a coolant by circulating the coolant through a radiator and operating an electric radiator fan, and flowing the coolant across the powertrain. The coolant is heated and circulated across the powertrain when a temperature of the powertrain is lower than ambient temperature.

18 Claims, 6 Drawing Sheets

FIG. 6

METHOD FOR PREHEATING A POWERTRAIN

TECHNICAL FIELD

The present application relates to heating a powertrain of a vehicle.

BACKGROUND AND SUMMARY

Under cold start conditions, a powertrain may be cooler than ambient conditions due to its larger thermal inertia. The engine upon startup has to overcome the lower powertrain temperature, and consequently, the time taken to reach an optimum operating temperature increases. This delay in reaching engine operating temperature may decrease fuel economy, increase engine wear, and increase exhaust emissions.

An example approach is shown by Murray et al. (U.S. Pat. No. 6,779,737) to enhance engine warm-up by preheating the engine when not in use. Engine oil and engine coolant are guided through a fluid heater, warmed, and later circulated across the engine and through the transmission. The fluid heater uses gasoline fuel to heat the engine oil and coolant. The vehicle compartment can also be heated by flowing the warmed coolant through a heater core.

However the inventors herein have identified potential issues with the above approach. For example, the fluid heater in U.S. Pat. No. 6,779,737 uses fuel to heat the engine oil and coolant resulting in increased fuel consumption and costs. Further, the fluid heater is an extra component that reduces available space.

The inventors herein have recognized the above issues and identified an approach to at least partly address the issues. In one example approach, a method for heating a powertrain in a parked and shut down vehicle, prior to an engine start, is shown. The method comprises, prior to an engine start and when a temperature of the powertrain is lower than ambient temperature, heating a coolant by circulating it through a radiator and operating an electric radiator fan, and then flowing the warm coolant across the powertrain. In this way, heat from the ambient air may be absorbed by the coolant and transferred to the powertrain.

For example, when a vehicle is parked outdoors and shut down with an engine at rest, a controller may be activated by a timer at regular intervals to monitor ambient temperature and a temperature of a powertrain. If the ambient temperature is higher than the powertrain temperature, and the difference in said temperatures is more than a threshold, the controller may initiate a procedure to warm the powertrain, prior to an engine start. An electric coolant pump and an electric thermostat may be activated to allow coolant circulation. The coolant may be circulated through a radiator while an electric radiator fan is operated to draw ambient air across the radiator exterior, thus enabling the coolant to absorb heat from ambient air. The warm coolant may be further circulated across the powertrain to preheat the powertrain.

In this way, a powertrain within a parked vehicle may be prevented from cooling below ambient temperature. By monitoring the powertrain temperature along with ambient conditions at regular intervals following vehicle shut down, the powertrain may be maintained at a temperature close to ambient, thus reducing the energy used for engine warm-up upon engine start. Since the coolant is warmed by absorbing heat from ambient air, fuel consumption remains largely unaffected. Further, by using existing components for preheating the powertrain, additional expenses can be avoided and space savings can be achieved.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
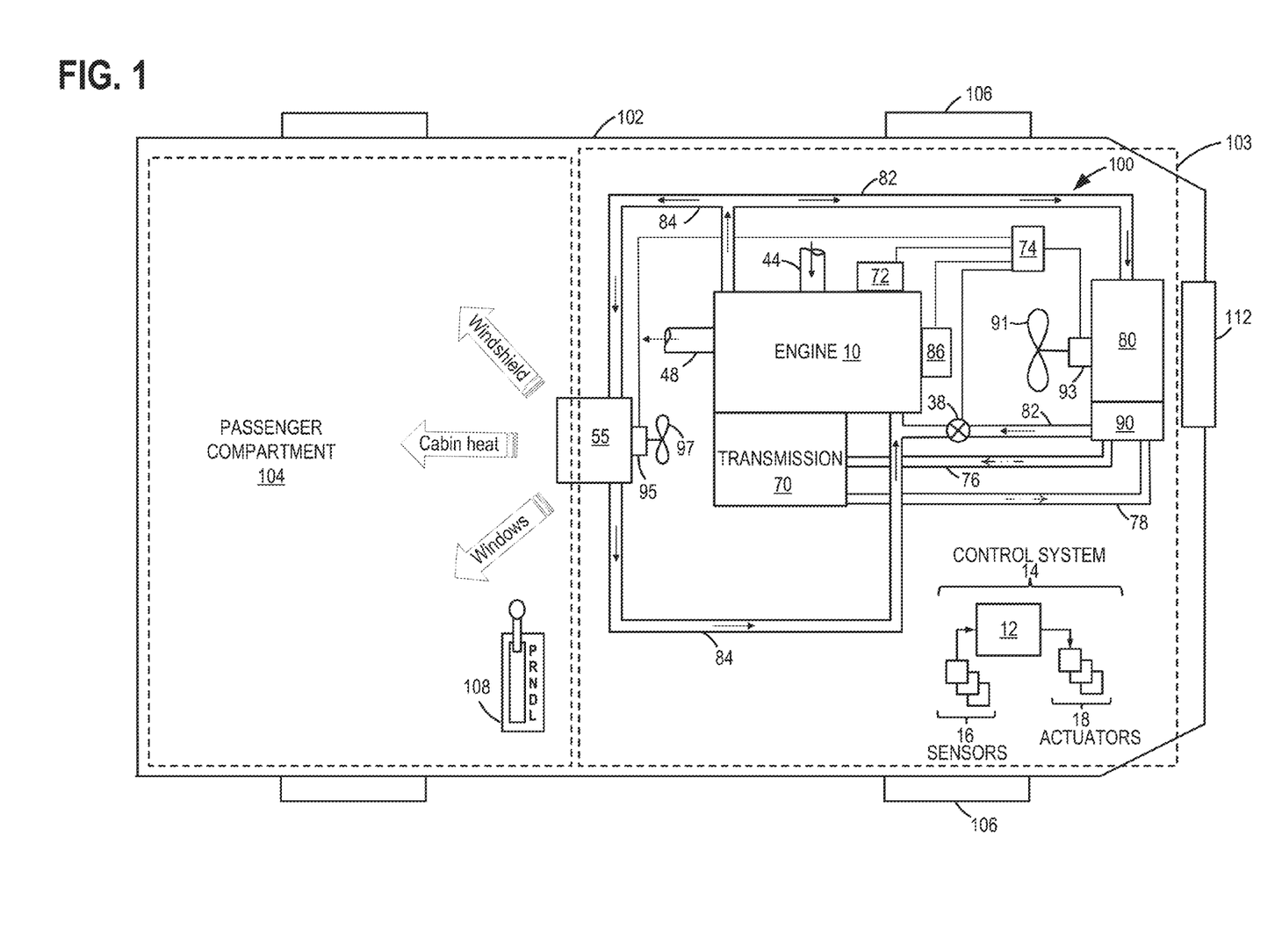
FIG. 1 schematically shows an example embodiment of a vehicle powertrain and a HVAC system in a motor vehicle.
Figure 2:
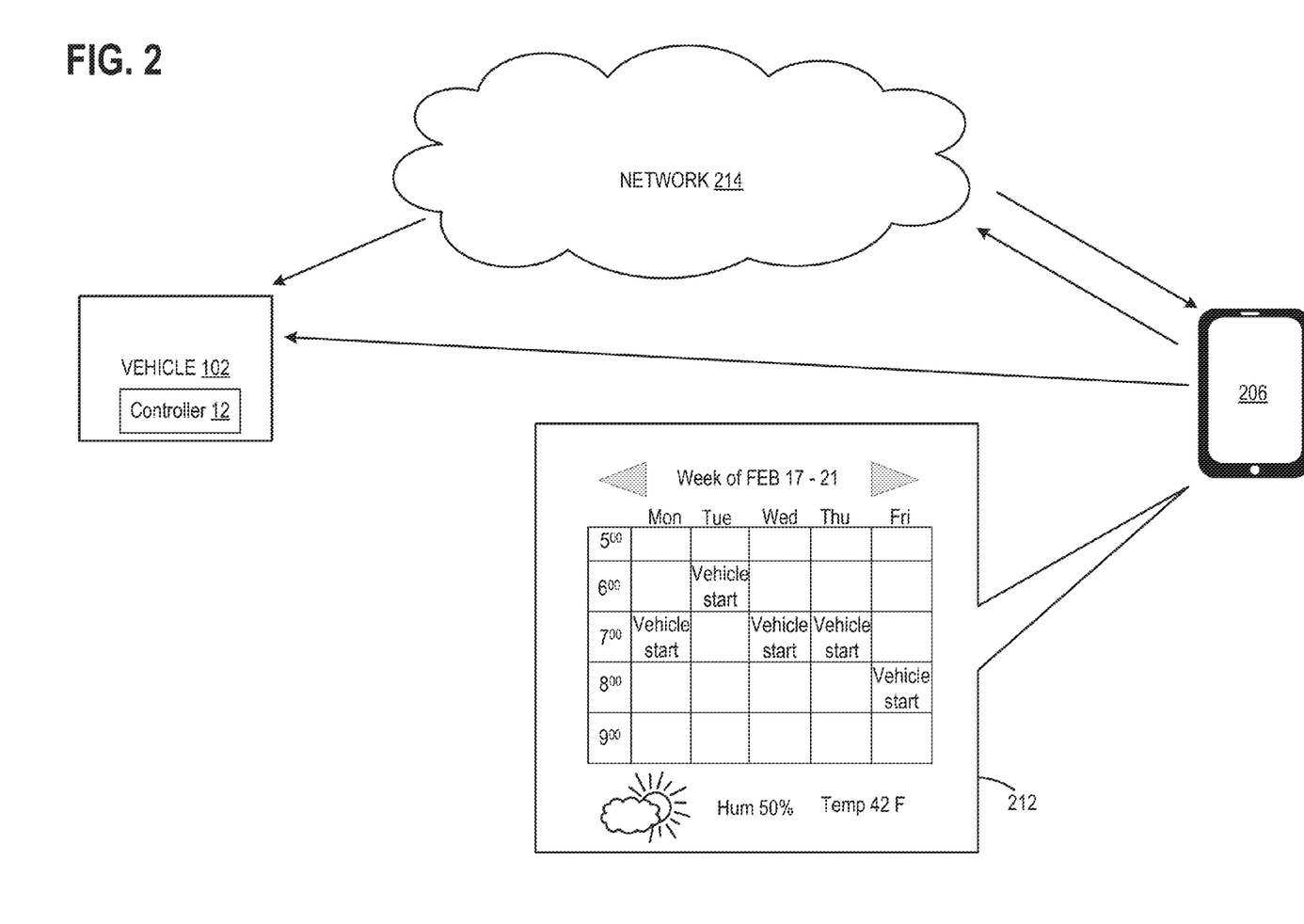
FIG. 2 schematically illustrates a communication system between a remote computing device and a vehicle.

The following description relates to systems and methods for climate control and powertrain preheating after an engine is shutdown to rest within a vehicle system, such as the system shown in FIG. 1. A controller may communicate with a remote computing device, as shown in FIG. 2, and receive data regarding a predetermined time of engine start. Alternatively, specific instructions to heat a selected component may also be communicated to the controller via the remote computing device. Additionally, the controller may be activated by a timer at regular intervals to monitor ambient and vehicle conditions to determine which vehicle component may be heated. Based on the data and/or instructions received, the controller may be configured to perform a control routine, such as the routine of FIG. 3, to identify existing vehicle and ambient conditions, and select a mode to heat specific vehicle components based on these identified conditions. Thus, a controller may select a routine, such as the example routine of FIG. 4, to preheat a powertrain to prevent it from cooling below ambient temperature when a vehicle is unoccupied and parked following engine shut down. Alternatively, based on ambient conditions, such as ambient dew point, and vehicle conditions, such as a windshield temperature being below the ambient dew point, the controller may perform a routine, such as the example routine of FIG. 5, to prevent condensation on the windshield and other windows of the cabin greenhouse. In another option, the controller may activate a cabin heating routine, such as the example routine of FIG. 6, when a vehicle has occupants but is parked following engine shut down, and a cabin temperature falls below a pre-selected cabin temperature. Additionally, the cabin heating routine may be triggered remotely by an operator.

FIG. 1 is an example embodiment of a vehicle heating, ventilation, and air-conditioning (HVAC) system 100 in a motor vehicle 102. Herein, HVAC system 100 is also referred to as cooling system 100. Vehicle 102 has drive wheels 106, a passenger compartment 104 (herein also referred to as cabin), and an under-hood compartment 103. Passenger compartment 104 includes a cabin greenhouse formed by the windshield (not shown) and other glass windows including a rear window (not shown). Under-hood compartment 103 may house various under-hood components under the hood (not shown) of motor vehicle 102. For example, under-hood compartment 103 may house a powertrain including internal combustion engine 10 and transmission 70. Internal combustion engine 10 has a combustion chamber which may receive intake air via intake passage 44 and may exhaust combustion gases via exhaust passage 48. Engine 10, as illustrated and described herein, may be included in a vehicle such as a road automobile, among other types of vehicles. While the example applications of engine 10 will be described with reference to a vehicle, it should be appreciated that various types of engines and vehicle propulsion systems may be used, including passenger cars, trucks, etc.

Transmission 70 may be powered by internal combustion engine 10 and may be an automatic or a manual transmission. Transmission 70 may be coupled with a crankshaft of engine 10 via an input shaft (not shown) and via a clutch (not shown) in the case of a manual transmission or via a torque converter (not shown) in the case of an automatic transmission. Transmission 70 may also include an output shaft (not shown) coupled with drive wheel 106. Thus, a mechanical output provided by engine 10 can be delivered to drive wheel 106 via transmission 70.

Under-hood compartment 103 may further include HVAC system 100 that circulates coolant through internal combustion engine 10 to absorb waste heat, and distributes the heated coolant to radiator 80 and/or heater core 55 via coolant lines 82 and 84, respectively. In one example, as depicted, cooling system 100 may be coupled to engine 10 and may circulate engine coolant from engine 10 to radiator 80 via electric coolant pump 86, and back to engine 10 via coolant line 82. Electric coolant pump 86 may be powered by battery 74 and, in one example, may circulate a fixed amount of coolant based on engine temperature. Specifically, electric coolant pump 86 may circulate coolant through passages in the engine block, head, etc., to absorb engine heat, which is then transferred via the radiator 80 to ambient air. Alternatively, as will be shown in this disclosure, the coolant may be circulated through the radiator to absorb heat from ambient air which may then be transferred to engine 10 or to the passenger compartment via heater core 55 via coolant line 84.

The temperature of the coolant may be regulated by a thermostat (or thermostat valve) 38, located in the cooling line 82, which may be kept closed until the coolant reaches a threshold temperature. In the embodiment described, thermostat valve 38 is an electric thermostat valve and is powered by battery 74. Therefore, electric thermostat 38 may be activated by the controller to allow a flow of the coolant without being dependent on coolant temperature.

Electric thermostat valve 38 may proportion flow between coolant line 84 (also termed as an engine loop) and coolant line 82 (also termed as a radiator loop). In the example of a coolant system including a degas bottle, valve 38 may be a three way thermostat valve. The electric thermostat valve 38 may control an amount of coolant flow within each of coolant lines 82 and 84. In one example, based on existing ambient and engine conditions, electric thermostat valve 38 may allow dominant flow within either coolant line 82 or coolant line 84. For example, if the powertrain retains residual heat, coolant may transfer heat from the powertrain to heater core 55 and there on to passenger compartment 104 and/or windshield and cabin greenhouse. Herein, electric thermostat 38 may block coolant line 82 and allow dominant coolant flow within coolant line 84.

Coolant may flow through coolant line 82, as described above, and/or through coolant line 84 to heater core 55 where heat may be transferred from the coolant to passenger compartment 104, and the coolant flows back to engine 10. Heater core 55 may thus act as a heat exchanger between the coolant and the passenger compartment 104. Fins may be attached to the heater core to increase the surface area for heat transfer. Air may be forced past the fins, for example by operating blower fan 97, to expedite heating of the passenger compartment. Hot air may also be blown by blower fan 97 through vents that direct heat to windshields and other windows (herein also referred to as cabin greenhouse) within the passenger compartment. Blower fan 97 is depicted in this embodiment as an electric fan connected to motor 95 that is powered by battery 74.

In addition to absorbing heat from engine 10, the coolant may also absorb (or exchange) heat from transmission fluid thus providing cooling for components within transmission 70. Transmission fluid may flow through transmission fluid line 78 into transmission cooler 90 where it may be cooled by transferring heat to the coolant flowing within coolant line 82. Thus, transmission fluid may exchange heat with the coolant within transmission cooler 90. Cooled transmission fluid may return to transmission 70 via transmission fluid line 76. Alternatively, a warm coolant may transfer heat to the transmission fluid within transmission cooler 90 when a request to warm a transmission is received, for example, prior to an engine start.

One or more cooling fans may be included in cooling system 100 to provide airflow assistance and augment an airflow through the under-hood components. For example, electric cooling fan (herein also referred to as radiator fan) 91, coupled to radiator 80, may be operated when the vehicle is moving and the engine is running to provide cooling airflow assistance through radiator 80. Radiator fan 91 may draw a cooling airflow into under-hood compartment 103 through an opening in the front-end of vehicle 102, for example, through grill 112. Such a cooling air flow may then be utilized by radiator 80 and other under-hood components (e.g., fuel system components, batteries, etc.) to keep the engine and/or transmission cool. Further, the air flow may be used to reject heat from a vehicle air conditioning system. Further still, the airflow may be used to improve the performance of a turbocharged/supercharged engine that is equipped with intercoolers that reduce the temperature of the air that goes into the intake manifold/engine. Radiator fan 91 is depicted as an electric fan and therefore may be coupled to battery driven motor 93.

During engine operation, the engine generated torque may be transmitted to alternator 72 along a drive shaft (not shown), which may then be used by alternator 72 to generate electrical power that may be stored in an electrical energy storage device, such as system battery 74. Battery 74 may then be used to activate electric cooling fan motor 93 via relays (not shown). Thus, operating the cooling fan system may include electrically powering cooling fan rotation from engine rotational input, through the alternator and system battery, for example, when engine speed is below a threshold (for example, when the engine is in idle-stop). In other embodiments, the cooling fan may be operated by enabling a variable speed electric motor coupled to the cooling fan.

In the embodiment described herein, radiator fan 91 may be operated to warm the coolant prior to an engine start. For example, when vehicle 102 is parked and shut down for a duration, the powertrain including engine 10 and transmission 70, may cool off. Prior to an engine start, controller 12 may periodically monitor powertrain temperature and ambient conditions. When the powertrain temperature is lower than ambient temperature, coolant flow through radiator 80 may be initiated by opening electric thermostat valve 38 and activating electric coolant pump 86. As the coolant flows through radiator 80, radiator fan 91 may be operated to draw warm ambient air across the radiator fins to warm the coolant. This warm coolant may be circulated further to transfer its heat to engine 10 and transmission 70 (via its transmission fluid). In other examples, the warm coolant may transfer its heat to heater core 55 and thereon to passenger compartment 104 and cabin greenhouse including the windshield and other windows.

Thus, the coolant may be used to absorb ambient heat and transfer said heat to the powertrain, the cabin, and/or the cabin greenhouse windows when needed. In another example, the coolant may be warmed by extracting residual heat from a powertrain which may be transferred to the cabin and/or the cabin greenhouse windows.

FIG. 1 further shows a control system 14. Control system 14 may be communicatively coupled to various components of engine 10 to carry out the control routines and actions described herein. For example, as shown in FIG. 1, control system 14 may include an electronic digital controller 12. Controller 12 may be a microcomputer, including a microprocessor unit, input/output ports, an electronic storage medium for executable programs and calibration values, random access memory, keep alive memory, and a data bus. As depicted, controller 12 may receive input from a plurality of sensors 16, which may include user inputs and/or sensors (such as transmission gear position, powertrain temperature, operator selected cabin temperature, intake air temperature, battery state of charge (BC), etc.), cooling system sensors (such as coolant temperature, cabin temperature, ambient humidity, ambient dew point, ambient temperature, etc.), and others (such as Hall Effect current sensors from the alternator and battery, occupancy sensors to determine vehicle occupants, ambient light sensors within the cabin, etc.).

Further, controller 12 may communicate with various actuators 18, which may include engine actuators (such as fuel injectors, an electronically controlled intake air throttle plate, spark plugs, etc.), cooling system actuators (such as motor circuit relays, electric coolant pump, electric thermostat, etc.), and others. In some examples, the storage medium may be programmed with computer readable data representing instructions executable by the processor for performing the methods described below as well as other variants that are anticipated but not specifically listed.

Controller 12 may also receive input from gear selector 108. A vehicle operator may be configured to adjust a gear of the transmission by adjusting the position of gear selector 108. In one example, as depicted, for an automatic transmission, gear selector 108 may have 5 positions (PRNDL gear selector). In another example, for a manual transmission, gear selector 108 may have 7 positions ($1^{st}$, $2^{nd}$, $3^{rd}$, $4^{th}$, $5^{th}$, reverse and neutral). Other embodiments may also be possible. Thus, controller 12 may receive input from gear selector 108 as to its existing position. For example, when a vehicle is parked and an engine is shut down, gear selector 108 may be in "P" or "park" position. In the example of a manual transmission, gear selector may be in $1^{st}$ gear, reverse gear, or neutral. In addition to these positions, a parking brake (not shown) may be engaged. Further, the parked and shut down vehicle may be have a security alarm that is activated.

Turning now to FIG. 2, it shows a communication set-up between controller 12 within vehicle 102 and a remote computing device 206. Remote computing device 206 may communicate with controller 12 either directly or via network 214. Remote computing device 206 may be a smartphone, a tablet, a laptop, or other type of computing device which may store and execute instructions (e.g., mobile applications) that allow the operator to communicate with controller 12 so that the controller can be remotely activated in order to perform routines such as those described in FIGS. 3, 4, 5 and 6. For example, as shown in FIG. 2, an operator vehicle start schedule, herein depicted as a weekly calendar, may be communicated from remote computing device 206 to controller 12. User interface 212 shows an anticipated vehicle start schedule for the operator for an upcoming week that may be modified by the operator. User interface 212 may include an intended time of vehicle start for each day of the week, and in some embodiments may also include a weather forecast for the day, ambient humidity, and ambient temperature as received from network 214.

Additionally or alternatively, controller 12 may be automatically activated by a timer at regular intervals through a portion of the entirety of the duration that the vehicle is parked in an inoperative mode with the engine at rest to monitor vehicle and ambient conditions. Further, controller 12 may be programmed to perform the routines described in FIGS. 3, 4, 5 and 6 based on monitored vehicle and ambient conditions.

Figure 3:
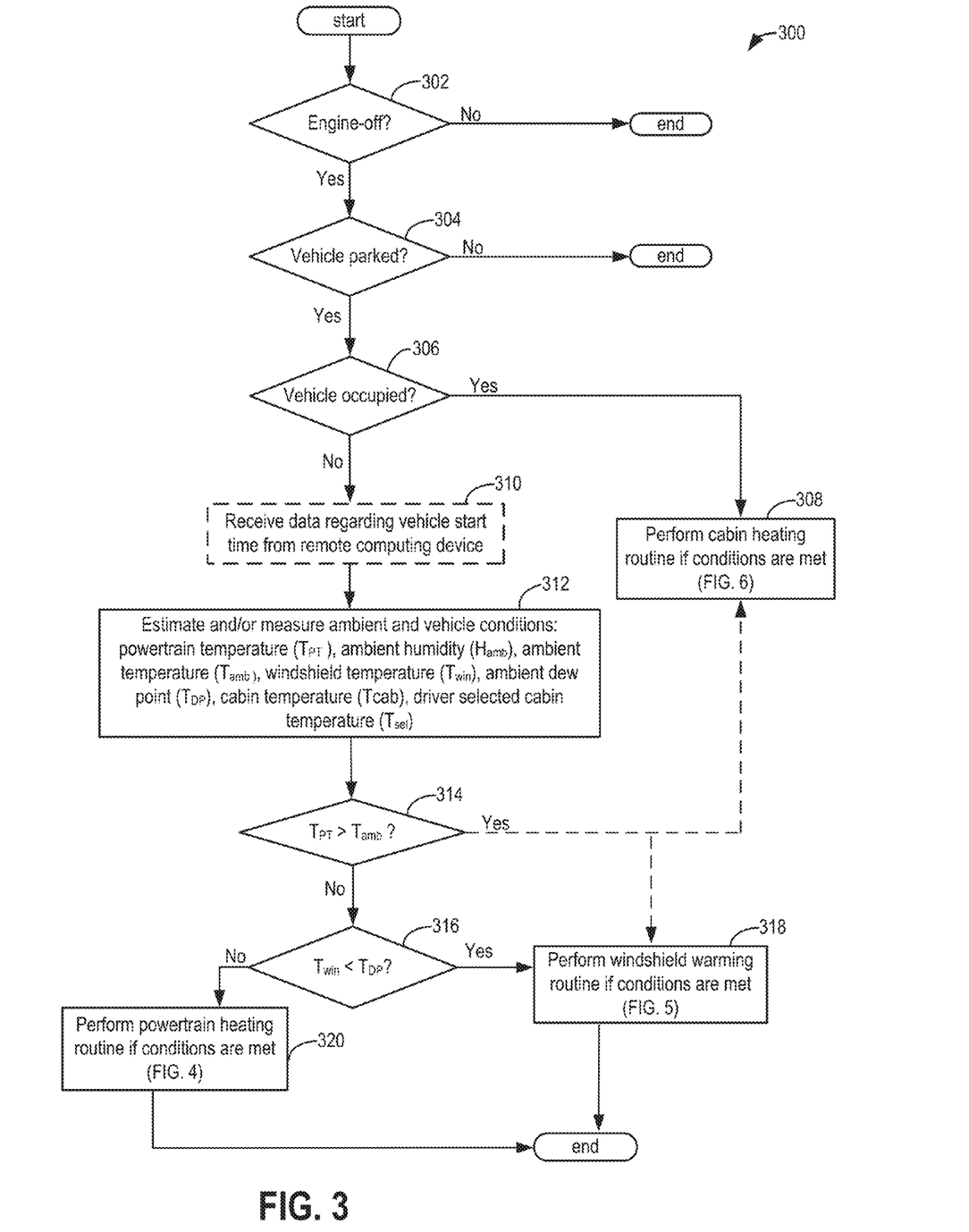
FIG. 3 shows a high level flow chart for selecting a component to be heated based on determined ambient and vehicle conditions.

Turning now to FIG. 3, an example routine 300 for selecting a vehicle component to be heated in a parked, stationary, engine-off vehicle based on existing ambient and vehicle conditions is depicted. A cabin may be heated, windows may be warmed to prevent condensation, and/or a powertrain may be preheated in anticipation of an engine start based on ambient temperature and a battery state of charge (BC).

At 302, routine 300 may confirm if the engine is off. An engine-off condition may include an engine at rest, an absence of combustion, a key-off condition, and/or other conditions. If the engine is not turned off, routine 300 ends. However, if it is established that the engine is off, at 304, routine 300 may determine if the vehicle is parked. In one example, a vehicle may be considered to be parked when the gear selector for an automatic transmission is in the "P" or "park" position. In the example of a vehicle with manual transmission, the vehicle may be parked when its parking brake engaged. If the vehicle is not parked, routine 300 ends.

If the vehicle is confirmed to be in a parked state, at 306, it may be determined if the vehicle is occupied. Occupancy sensors may indicate the presence or absence of vehicle occupants. In another example, the opening of vehicle doors may be sensed by the controller to determine if occupants are present within the vehicle. If it is determined that the vehicle is occupied, at 308, a cabin heating routine may be initiated if ambient and vehicle conditions are met. The cabin heating routine will be described later in reference to FIG. 6.

If the vehicle is unoccupied, routine 300 may proceed to optional step 310 where the controller may receive data from a remote computing device. This may include receiving indication of a predetermined time that the operator intends to start the vehicle based on the operator's daily schedule. As described earlier in reference to FIG. 2, an operator may enter data regarding his or her weekly schedule into a mobile application on his or her remote computing device (e.g., smart phone). This weekly schedule may include preset times regarding vehicle starts on a given day. Thus, receiving the indication of the predetermined time when the operator intends to start the vehicle may comprise receiving a schedule of a plurality of predetermined times the operator intends to start the vehicle.

Based on the data received, prior to the predetermined time that the operator intends to start the vehicle and while the vehicle is inoperative, routine 300 may transfer heat from ambient air to a selected vehicle component. The selected vehicle component may be one or more of the powertrain, windshield and other windows, and the cabin of the vehicle. The transfer of heat from ambient air to a selected vehicle component may be activated by the controller based on the difference in temperature between ambient and the selected vehicle component. In one example, if the windshield temperature is significantly lower than ambient dew point, the controller may initiate a transfer of heat 30 minutes prior to the predetermined time of vehicle start. In another example, if powertrain temperature is slightly below ambient temperature, the heat transfer routine may be initiated 5 minutes before the predetermined time of vehicle start.

Thus, at 312, routine 300 may estimate and/or measure various parameters related to ambient and vehicle conditions. These parameters may include ambient temperature ($T_{amb}$), ambient dew point ($T_{DP}$), ambient humidity ($H_{amb}$), cabin temperature ($T_{cab}$), driver selected cabin temperature ($T_{sel}$), powertrain temperature ($T_{PT}$), and windshield temperature ($T_{win}$). Ambient temperature may be measured by a temperature sensor located on the front bumper of the vehicle, for example, while dew point may be measured from a dew point sensor placed on the windshield, for example, or may be determined based on output from a vehicle humidity sensor and measured ambient temperature. Cabin temperature may be measured by temperature sensors within the cabin while windshield temperature may be inferred from cabin temperature and ambient temperature. Ambient conditions such as humidity and temperature may also be received by the controller from the network. Herein, ambient humidity refers to relative humidity. Powertrain temperature may be measured by temperature sensors that measure coolant temperature and transmission fluid temperature.

At 314, routine 300 may check if powertrain temperature, $T_{PT}$, is higher than ambient temperature, $T_{amb}$. For example, a powertrain temperature may be higher than ambient temperature when a vehicle has recently been shut down. The powertrain temperature may remain higher than ambient temperature for a duration following engine shut down. If powertrain temperature is confirmed to be higher than ambient temperature, heat from the powertrain may be transferred to one or both of the cabin and the windshield. The controller may choose to use heat from the powertrain to perform the cabin heating routine (at 308) if it receives a command from the operator via a remote computing device to heat the cabin. The cabin heating routine may also be preferred when an engine start is imminent based on operator schedule. On the other hand, routine 300 may divert heat from the powertrain to the windshield and other glass windows (at 318) of the cabin greenhouse if an on-board dash light level sensor indicates a low level of sunlight within the car combined with a windshield temperature below ambient dew point. The controller may use an on board dash light level sensor to determine if it is day or night. For example, if the dash light level sensor indicates that it is sunny, the windshield warming routine may not be initiated since the sun will eventually warm up the windshield and the cabin.

If, at 314, the powertrain temperature is determined to be lower than ambient temperature, routine 300 may proceed to 316 where the windshield temperature may be compared to ambient dew point. If the windshield temperature is determined to be lower than the ambient dew point, at 318, the windshield warming routine may be performed if other conditions are met. This routine will be further explained in reference to FIG. 5. If the windshield temperature is higher than the ambient dew point, at 320, a powertrain heating routine may be implemented if conditions are met. The powertrain heating routine will be described in reference to FIG. 4.

Thus, the controller within a parked and shut down vehicle may monitor ambient and vehicle conditions, and based on these ambient and vehicle conditions, may select a vehicle component to be warmed. In some examples, heat may be transferred to the selected vehicle component only if ambient temperature is greater than a temperature of the selected vehicle component by more than a threshold amount. Further, as will be described in reference to FIGS. 4, 5 and 6, heat from ambient may be transferred to the selected vehicle component by activating an electric coolant pump and an electric radiator fan and opening an electric thermostat to transfer heat from ambient to coolant and transferring heat from the coolant to the selected vehicle component. The transfer of heat from ambient to the selected vehicle component may be disabled when a battery charge is lower than a threshold.

If the vehicle is occupied and residual heat exists in the powertrain, the cabin may be heated in preference to the other components. If the vehicle is unoccupied, the windshield warming routine may be selected over the powertrain heating sequence if the light level sensor indicates a low level or no sunlight and if the windshield temperature is below ambient dew point. In another example, the operator may remotely command the controller to heat the windshield and other glass windows. On the other hand, without any manual override from the operator, the controller may determine that fuel economy and emissions benefits are preferred over driver comfort, and the powertrain may be warmed before the windshield is heated.

Figure 4:
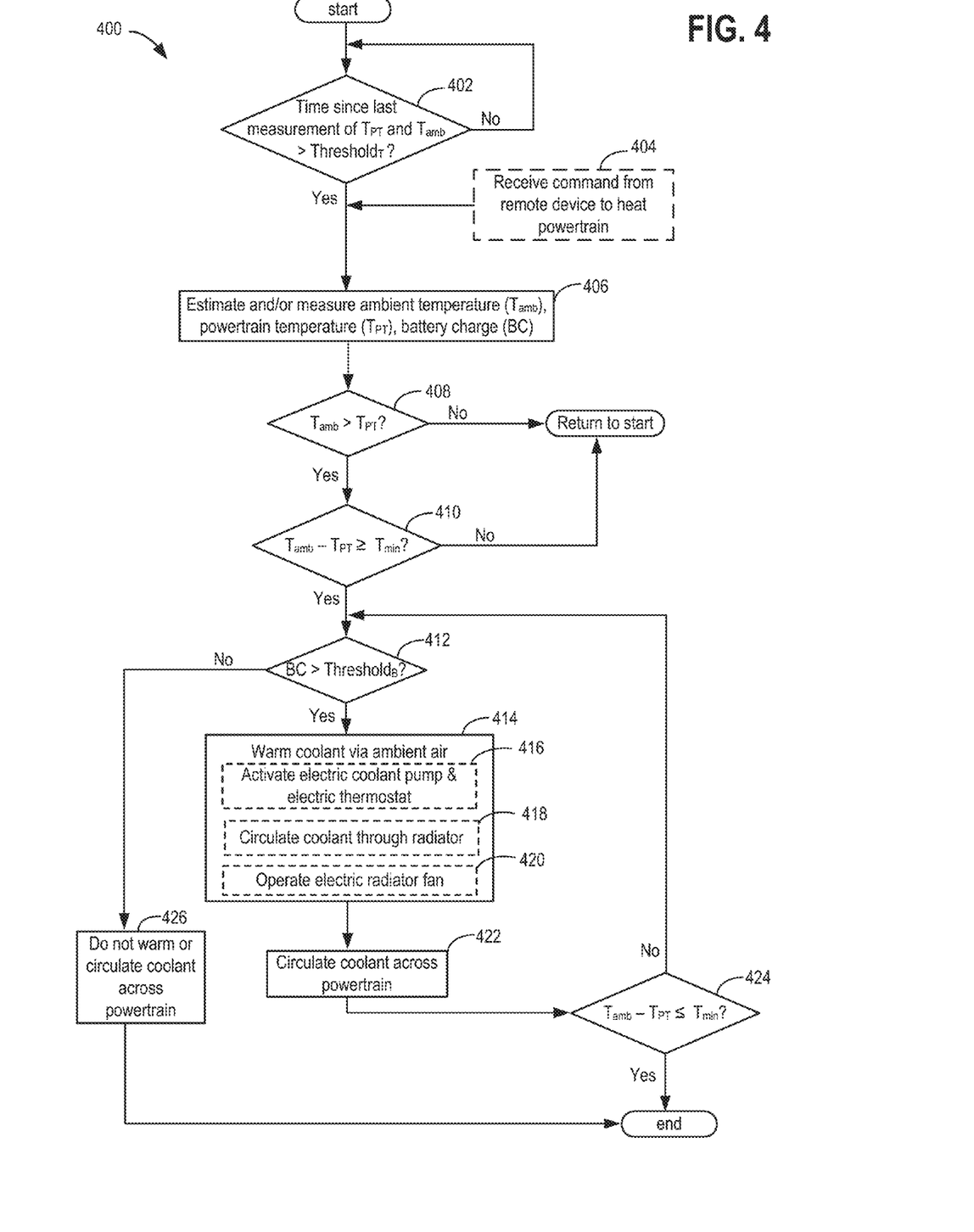
FIG. 4 depicts an example flowchart illustrating a routine to preheat a powertrain using ambient temperature as a heat source.

Turning now to FIG. 4, a routine 400 for performing a powertrain heating sequence in an unoccupied vehicle following shut down with an engine at rest is illustrated. Specifically, the controller within a shutdown, parked vehicle with an engine at rest monitors powertrain temperature and ambient temperature. When the temperature of the powertrain is lower than ambient temperature by at least a threshold value, the coolant is heated by circulation through a radiator via the electric coolant pump as an electric radiator fan is operated, and the heated coolant is then circulated across the powertrain to heat the powertrain. This routine may be activated at regular intervals by the controller based on ambient and vehicle conditions or it may be performed based on an operator schedule. Additionally, the routine may also be implemented based on operator demand via a remote computing device.

At 402, routine 400 may confirm if the time since a previous measurement of powertrain temperature and ambient temperature is more than a threshold, e.g., Threshold$_T$. For example, a timer may activate the controller at regular intervals to automatically monitor the powertrain temperature and ambient temperature. In one example, the threshold may depend on the rate of temperature change. In another example, Threshold$_T$ may also depend on the time of day. For example, Threshold$_T$ may be shorter if an engine start time is anticipated, e.g., Threshold$_T$ may be 60 minutes. If an engine start is not anticipated, Threshold$_T$ may be longer, such as a gap of 90 minutes.

If the time since a last measurement has not surpassed Threshold$_T$, routine 400 may return to start and may wait for a later time. On the other hand, if the time since the last temperature measurement is more than Threshold$_T$, at 406, routine 400 may measure and/or estimate vehicle conditions and ambient conditions. Optionally, prior to 406, the controller may receive a command from an operator via a remote computing device, at 404, to heat the powertrain. Thus, an operator may override the timer and initiate the powertrain heating routine.

Returning to 406, the estimated and/or measured ambient and vehicle conditions may include battery state of charge, ambient temperature, powertrain temperature, etc. For example, the controller may monitor battery charge to ensure that the powertrain heating routine is triggered only if battery charge is above a threshold. Since the vehicle is shut down, and the engine is at rest without any combustion, a battery may be used to power various components that are activated during the powertrain heating sequence.

At 408, routine 400 may determine if ambient temperature ($T_{amb}$) is higher than powertrain temperature ($T_{PT}$). If the ambient temperature is lower than the powertrain temperature, the routine ends and may return to start. If the ambient temperature is determined to be higher than the powertrain temperature, at 410, routine 400 may confirm that the ambient temperature is higher than the powertrain temperature by at least a threshold, e.g., $T_{min}$. In one example, $T_{min}$ may be 10 deg C whereas in another example $T_{min}$ may be 20 deg C. Threshold $T_{min}$ may be selected based on the energy used for activating the pump, thermostat, and fan. For example, if the difference in temperatures between the powertrain and the ambient is smaller than $T_{min}$, heat transfer between the ambient and the coolant may take a longer time, thus wasting battery charge (BC) for a smaller rise in powertrain temperature over a longer duration. Thus, if the difference between the powertrain temperature and the ambient temperature is less than the threshold, $T_{min}$, routine 400 may return to start.

If the ambient temperature is higher than the powertrain temperature by the threshold, $T_{min}$, at 412, routine 400 may determine if BC is higher than a threshold, Threshold$_B$. Since the powertrain heating sequence, routine 400, uses battery power to operate different components, e.g., the electric coolant pump, electric radiator fan etc., to enable heat exchange between the coolant and ambient air, the battery has to support energy draw while retaining enough power for an engine start. In one example, Threshold$_B$ may be 50% whereas in another example Threshold$_B$ may be 75%. If BC is confirmed to be lower than Threshold$_B$, at 426, coolant circulation and warming may be disabled, and the powertrain heating sequence may be deactivated.

If BC is higher than Threshold$_B$, at 414, the coolant may be warmed by extracting heat from ambient air. At 416, the electric coolant pump may be activated and the electric thermostat may be triggered to open and allow coolant circulation. At 418, coolant may be circulated through the radiator and at 420, the electric radiator fan may be operated to draw ambient air across the radiator allowing heat exchange between the ambient air and the coolant. At 422, the warmed coolant may be circulated across the powertrain including the engine block and the transmission. Thus, heat may be transferred from the warm coolant to the powertrain. Further, transmission fluid may be warmed by heat exchange with the coolant.

At 424, routine 400 may confirm if the powertrain temperature, $T_{PT}$, and the ambient temperature, $T_{amb}$, are within a threshold value, e.g., $T_{min}$, of each other. For example, the ambient and the powertrain temperature may now differ by less than the threshold value, $T_{min}$. If the powertrain temperature and the ambient temperature differ by less than $T_{min}$, routine 400 ends, and coolant circulation may be disabled by deactivating the electric coolant pump, the electric radiator fan may be stopped, and the electric thermostat may be closed. On the other hand, if the difference between the powertrain temperature and the ambient temperature remains more than the threshold, $T_{min}$, routine 400 may return to 412, to confirm if the battery can support continued heating of the powertrain.

In this way, a powertrain may be preheated prior to engine start when the powertrain temperature is lower than the ambient temperature by at least a threshold value. The coolant may be utilized to absorb heat from ambient air and transfer said heat to the powertrain. Further, powertrain heating may be performed when the battery charge can support power draw by the electric coolant pump, the electric thermostat, and the electric radiator fan. An operator may command the controller via a remote computing device to activate the powertrain heating sequence. The activation command may be configured to activate the controller while the vehicle is shut down in order to measure the powertrain temperature and the ambient temperature and heat the powertrain via the coolant if powertrain temperature is lower than ambient temperature. Alternatively, the controller may trigger the powertrain heating sequence, prior to an engine start, based on an operator schedule. The powertrain heating sequence may be further initiated when the controller is automatically activated by a timer at regular intervals, while the vehicle is shut down, in order to measure the powertrain temperature and the ambient temperature.

Figure 5:
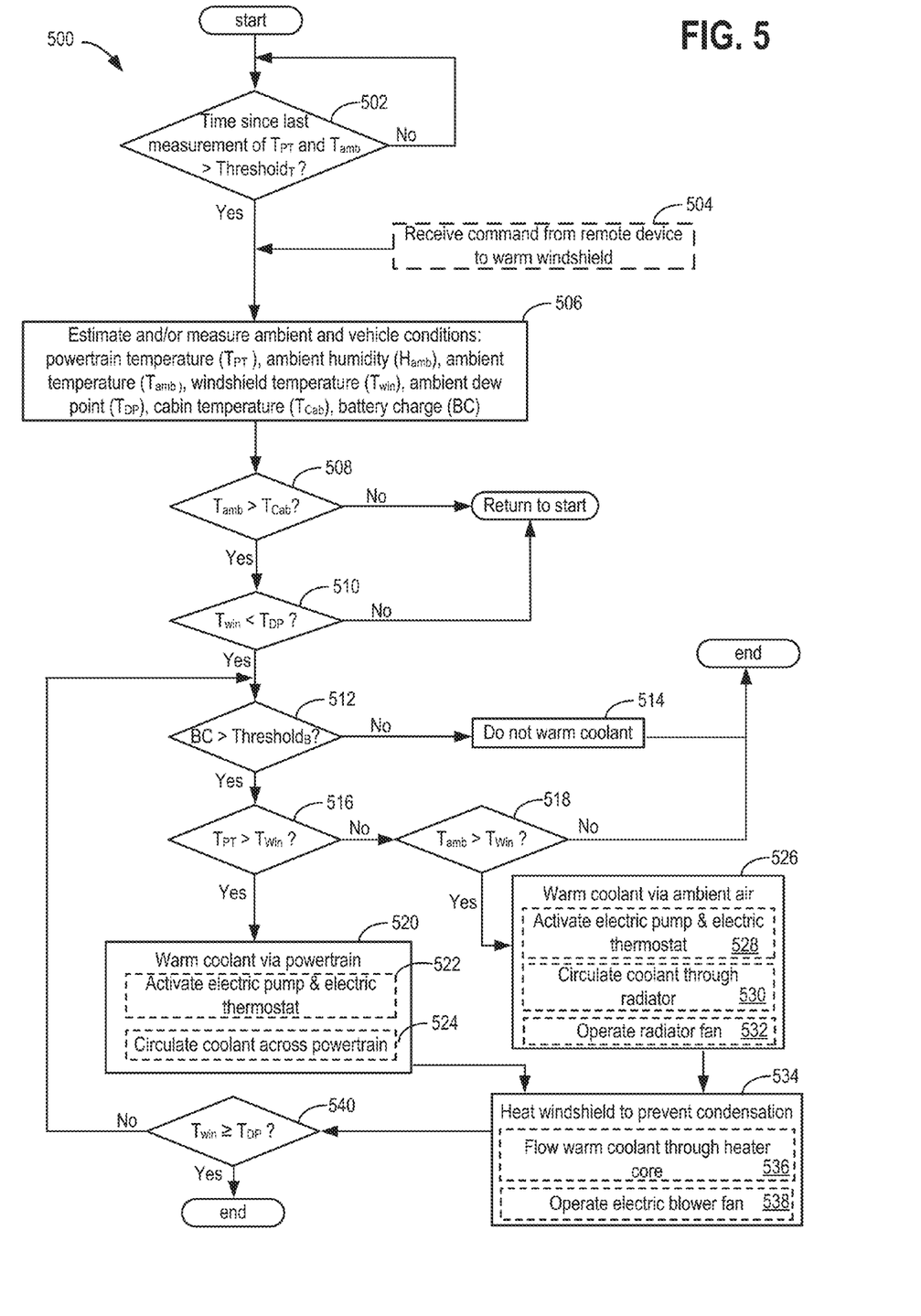
FIG. 5 is an example flowchart depicting a routine to prevent condensation on a windshield based on ambient and vehicle conditions.

Turning now to FIG. 5, a routine 500 for heating a windshield when the windshield temperature is below ambient dew point is depicted. Specifically, following vehicle shut down and when a temperature of a windshield is lower than ambient dew point, heat may be transferred from a powertrain of the vehicle to the windshield via a coolant if powertrain temperature is higher than the windshield temperature. If the powertrain temperature is lower than the windshield temperature but ambient temperature is higher than the windshield temperature, heat may be transferred from ambient air to the windshield via the coolant.

At 502, routine 500 may confirm if the time since a previous measurement of powertrain temperature and ambient temperature is more than a threshold, e.g., Threshold$_T$. Specifically, the controller may be activated by a timer at regular intervals to measure the two temperatures. This step may be the same as step 402 of routine 400. In one example, Threshold$_T$ may depend on the time of day. For example, Threshold$_T$ may be smaller if it is nighttime. For example, at nighttime, Threshold$_T$ may be 60 minutes. If it is daytime and the vehicle is exposed to sunshine, Threshold$_T$ may be 90 minutes or longer.

If the time since a last measurement has not surpassed Threshold$_T$, routine 500 may return to start and may check the two temperatures at a later time. On the other hand, if the time since the last temperature measurement is more than Threshold$_T$, at 506, routine 500 may measure and/or estimate vehicle conditions and ambient conditions. Optionally, prior to 506, the controller may receive a command from an operator via a remote computing device at 504 to heat the windshield. Thus, an operator may override the timer and initiate the windshield warming routine.

Returning to 506, the estimated and/or measured ambient and vehicle conditions may include battery state of charge, ambient temperature, powertrain temperature, ambient humidity, ambient dew point, windshield temperature, cabin temperature, etc. For example, ambient and vehicle conditions may be monitored to evaluate whether a specific vehicle component should be heated. Thus, the windshield warming routine may be activated only when the windshield temperature is lower than ambient dew point and when condensation may occur on cabin greenhouse glass surfaces.

Windshield temperature, $T_{win}$, may be inferred from cabin temperature ($T_{cab}$) and ambient temperature ($T_{amb}$). Ambient humidity and dew point may be values received either from sensors or from weather reports received via a network. The controller may further use an on board light level sensor to determine if it is day or night. For example, if the light level sensor indicates that it is sunny, the windshield warming routine may not be initiated since the sun will eventually warm up the windshield and the cabin.

At 508, routine 500 may confirm if the ambient temperature is higher than the cabin temperature. Ambient temperature may increase at sunrise and as daytime progresses. Under these conditions, the ambient temperature may rise faster than the cabin and window temperatures, and condensation on cabin windows may be more likely. If, at 508, routine 500 determines that ambient temperature is lower than cabin temperature, the routine may return to start. However, if the ambient temperature is higher than cabin temperature, at 510, routine 500 may confirm if the windshield temperature is below ambient dew point. Since water condenses out of air on surfaces that are at temperatures below the dew point, routine 500 may heat the windshield to prevent condensation on the windshield if the windshield temperature is determined to be lower than ambient dew point.

If the windshield temperature, $T_{win}$, is higher than the dew point, $T_{DP}$, routine 500 returns to start. If $T_{win}$ is lower than the ambient dew point, $T_{DP}$, routine 500 proceeds to 512 where it may confirm if the battery charge (BC) is higher than a threshold, $Threshold_B$. A battery may be used to power various components like the electric coolant pump and the electric thermostat to enable coolant circulation during the windshield warming routine. Further, the battery has to retain a charge for an engine start. Hence, if BC is less than $Threshold_B$, routine 500 may deactivate the windshield warming routine, at 514, and stop the warming of the coolant.

If the BC is higher than $Threshold_B$, at 516, routine 500 may confirm if the powertrain temperature is higher than windshield temperature. If powertrain temperature, $T_{PT}$, is higher than windshield temperature, $T_{win}$, at 520, the coolant may be warmed via the powertrain. The electric coolant pump and the electric thermostat may be activated at 522 and the coolant may be circulated across the powertrain at 524. Thus, the coolant may absorb residual heat from the powertrain components.

If $T_{PT}$ is lower than $T_{win}$, routine 500 proceeds to 518 where it may determine if ambient temperature, $T_{amb}$, is higher than $T_{win}$. If the ambient temperature is lower than the windshield temperature, routine 500 ends. However, if $T_{amb}$ is determined to be higher than $T_{win}$, at 526, the coolant may be warmed via ambient air. The electric coolant pump and the electric thermostat may be activated at 528 to enable the flow of coolant through the radiator at 530. At 532, the electric radiator fan may be operated to draw ambient air across the radiator to allow the coolant to extract heat from the ambient air. At 534, routine 500 may prevent condensation on the windshield by flowing warmed coolant through the heater core, at 536, and by activating the electric blower fan, at 538. Thus, air warmed by the coolant may be blown onto the windshield and other glass windows via different vents.

Next, at 540, routine 500 may confirm if $T_{win}$ is higher than or equal to the ambient dew point, $T_{DP}$. The temperature that the windshield is raised to prevent condensation may depend on ambient humidity. For example, if humidity is lower, e.g. 50%, the windshield temperature may be raised to less than ambient temperature, e.g., by 5 deg C, to prevent condensation. Since $T_{DP}$ is lower than $T_{amb}$ when ambient humidity is below 100%, $T_{win}$ may be raised to more than $T_{DP}$ but less than $T_{amb}$ to prevent condensation. Since fog may form on micro dust particles when the difference between $T_{amb}$ and $T_{DP}$ is less than 2.5° C. (4° F.), $T_{win}$ may be increased to above $T_{DP}$ to ensure that condensation is avoided. If inertial heat from the engine is available, $T_{win}$ may be higher than $T_{amb}$. In another example, if ambient humidity is higher, e.g., 95%, the windshield may be heated to a temperature equal to ambient temperature to prevent condensation.

If $T_{win}$ is equal to or higher than $T_{DP}$, routine 500 ends and coolant warming and circulation may be deactivated. If, on the other hand, $T_{win}$ is lower than $T_{DP}$, the windshield warming routine may be continued by returning to step 512 and confirming that BC is above $Threshold_B$.

In other embodiments, a frost point temperature may be used instead of dew point temperature. For example, the windshield and other glass surfaces may be warmed to the frost point temperature, which is higher than the dew point temperature, to prevent the formation of frost.

In yet other embodiments, a conventional passive thermostat made of wax may be used instead of an electric thermostat valve. Herein, the controller may be instructed to activate the windshield heating routine 500 only when the powertrain temperature is higher than windshield temperature. However, if the powertrain temperature has reached the overnight ambient temperature or is lower than windshield temperature, routine 500 may be disabled.

In this way, condensation on the windshield and other glass windows may be prevented in a parked vehicle following vehicle shut down. In one example, the controller may communicate with a remote computing device and receive the vehicle operator's intended vehicle start schedule. The operator's schedule may include a specific time for engine start on a given day. Based on ambient and vehicle conditions, the controller may determine a specific time to initiate the windshield heating routine prior to the expected engine start. The time of initiation of the windshield heating routine may depend on the difference between the windshield temperature and ambient dew point. If the windshield temperature is slightly below the dew point, e.g. 5 deg C, the windshield warming routine may be initiated 10 minutes prior to engine start. In another example, if the windshield temperature is significantly below the dew point, e.g., 15 deg C, the windshield warming routine may be initiated 30 minutes prior to engine start.

In another example, the controller may be configured to automatically activate at regular intervals while the vehicle is shut down and monitor ambient dew point, ambient temperature, ambient humidity, the windshield temperature, and the powertrain temperature. Based on the above ambient and vehicle conditions, the windshield heating routine may be activated by the controller. In a further example, the windshield warming routine may be triggered by a command from the operator via a remote computing device.

It will be appreciated that a condition may exist such that powertrain temperature and ambient temperature may both be higher than $T_{win}$. In this condition, the controller may first choose to transfer heat from the powertrain via coolant to the windshield. Only after the residual heat within the powertrain has been extracted and if the windshield temperature remains below ambient dew point, the coolant may be warmed via ambient air. Transferring heat from the powertrain to the windshield does not use the electric radiator fan whereas heat transfer from ambient air to coolant uses the electric radiator fan in addition to the electric coolant pump, electric thermostat, and electric blower fan.

Thus, the windshield heating routine comprises heating a windshield via coolant warmed by circulation across a powertrain when a temperature of the powertrain is higher than a windshield temperature, and heating the windshield via coolant warmed by ambient air by circulating the coolant through a radiator and operating an electric radiator fan when the powertrain temperature is lower than the windshield temperature and ambient temperature is higher than the windshield temperature. The routine further comprises flowing the warmed coolant across a heater core and activating an electric blower fan. Further, the windshield heating routine is activated only when the windshield temperature is lower than a dew point of surrounding air.

Figure 6:
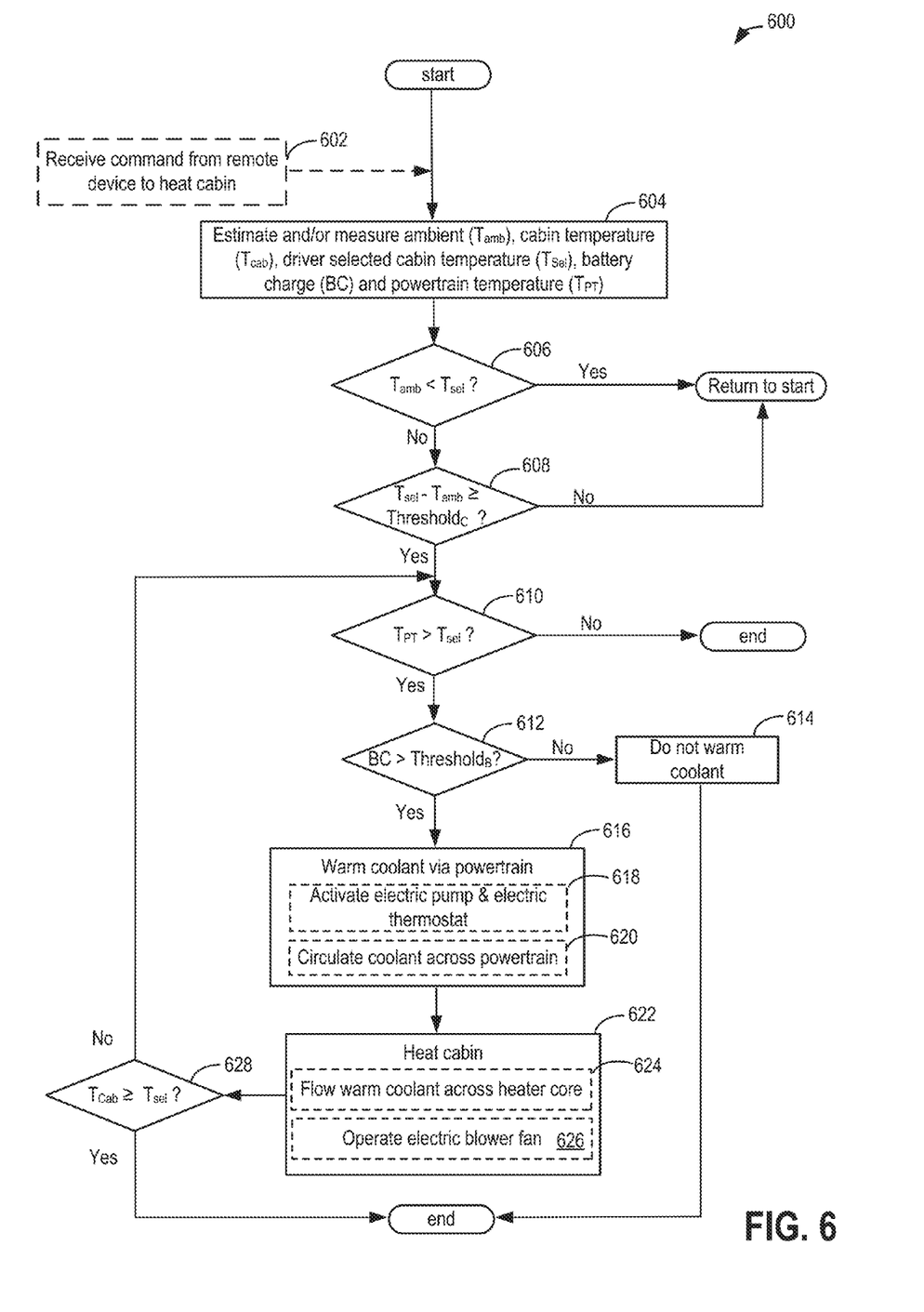
FIG. 6 is an example flowchart depicting a method to heat a cabin using powertrain heat according to the present disclosure.

Turning now to FIG. 6, it shows routine 600 for performing a cabin heating routine in a parked vehicle with an engine at rest. Specifically, the cabin heating routine is activated when a cabin temperature falls below an operator selected temperature. Herein, if the powertrain temperature is higher than the operator selected cabin temperature, coolant is circulated across the powertrain to absorb heat and this heat is transferred to the vehicle cabin. The vehicle may be occupied or vacant. Further, the cabin heating routine may either be remotely activated by an operator or automatically activated by the controller.

At 602, an optional command to heat the vehicle cabin may be received from the operator via a remote computing device. Another example may include receiving an operator's daily schedule from the remote computing device comprising an indication of a predetermined time that the operator intends to start the vehicle. Herein, the controller may initiate a cabin heating routine prior to the predetermined time of engine start.

At 604, routine 600 may estimate and/or measure various ambient and vehicle conditions including ambient temperature ($T_{amb}$), driver selected cabin temperature ($T_{sel}$), battery charge (BC) and powertrain temperature ($T_{PT}$). Ambient and vehicle conditions may be monitored to evaluate whether the cabin is to be heated. For example, the cabin heating routine may be activated only when the ambient temperature is lower than a driver selected temperature. Since the cabin is heated via powertrain residual heat, the cabin heating routine may also depend on powertrain temperature being higher than the driver selected cabin temperature.

At 606, routine 600 may confirm if ambient temperature is lower than driver selected cabin temperature ($T_{sel}$). If the ambient temperature is higher than $T_{sel}$, routine 600 returns to start. For example, the cabin may cool faster if ambient air temperature is lower than $T_{sel}$. If the ambient air temperature is higher than $T_{sel}$, the cabin may cool at a slower pace.

If $T_{amb}$ is lower than $T_{sel}$, at 608, routine 600 may further determine if $T_{amb}$ is lower than $T_{sel}$ by a threshold level, $Threshold_C$. $Threshold_C$ may determine the rate at which a cabin temperature may cool to below the driver selected temperature, $T_{sel}$. The higher the difference in temperatures between ambient and cabin temperature, the faster the rate of cool off. In one example, $Threshold_C$ may be a difference of 25%. In another example, $Threshold_C$ may be a difference of 40%.

If at 608, the difference between ambient temperature and $T_{sel}$ is less than $Threshold_C$, routine 600 may return to start. By waiting till the difference in temperatures is above a threshold level, the controller may prevent a waste of battery charge since the cabin heating routine is performed in a vehicle with an engine at rest and involves activating components that will draw power from the battery.

If the ambient temperature is lower than $T_{sel}$ by at least $Threshold_C$, routine 600 proceeds to 610 where it may determine if the powertrain temperature, $T_{PT}$, is higher than $T_{sel}$. If $T_{PT}$ is lower than $T_{sel}$, routine 600 ends. If $T_{PT}$ is higher than $T_{sel}$, at 612, routine 600 may confirm if BC is higher than a threshold level, $Threshold_B$. A battery may be used to power various components like the electric coolant pump and the electric thermostat to enable coolant circulation during the cabin heating routine. Hence, if BC is less than $Threshold_B$, routine 600 may deactivate the cabin heating routine and at 614, stop warming the coolant.

If BC is higher than $Threshold_B$, at 616, the coolant may be warmed via the powertrain. Therefore, at 618, the electric coolant pump and the electric thermostat are activated and at 620, the coolant is circulated across the powertrain. The coolant may extract residual heat from the powertrain components and may transfer this heat to the cabin. At 622, the cabin may be heated by flowing the warm coolant through a heater core at 624 and by activating an electric blower fan at 626. Air may be heated via heat exchange with the coolant and may be blown into the vehicle cabin via cabin heating vents. At 628, routine 600 may confirm if cabin temperature, $T_{cab}$, is equal to driver selected temperature, $T_{sel}$. If the cabin temperature is equal to the selected temperature, routine 600 ends and coolant circulation may be disabled by deactivating the electric coolant pump and the electric thermostat. If the cabin temperature is lower than $T_{sel}$, routine 600 returns to step 610 where if the powertrain temperature remains higher than $T_{sel}$ and BC is higher than $Threshold_B$, the cabin heating routine may be continued.

Thus, when the ambient temperature is lower than an operator selected cabin temperature by a threshold, and the powertrain temperature is higher than the operator selected cabin temperature, coolant may be first circulated across the powertrain to absorb heat, and later, the coolant may be further circulated through a cabin heating system. The cabin heating routine as described above may be initiated when a vehicle is occupied. If the vehicle is unoccupied, the ambient temperature is lower than an operator selected cabin temperature by a threshold, and the powertrain temperature is higher than the operator selected cabin temperature, the controller may receive an activation command from an operator via a remote computing device to circulate coolant across the powertrain, the coolant being further circulated through a cabin heating system.

It will be appreciated that the windshield warming routine (500) may also heat the cabin. By blowing hot air towards the interior surfaces of the windshield and cabin windows, hot air may also be circulated throughout the cabin. Likewise, by heating the cabin and maintaining the cabin temperature at a driver selected temperature, the windshield temperature may remain at or higher than ambient dew point, thus, preventing condensation of water.

Similarly, if the ambient temperature is higher than the powertrain temperature and the windshield temperature, the coolant may be circulated across the powertrain and through the heater core to simultaneously preheat the powertrain and warm the cabin windows to prevent condensation and frost formation if the temperature is below freezing.

Thus, various components within a vehicle may be heated either by drawing heat from ambient air or by transferring heat from a warm powertrain. The component to be heated may either be selected based on the operator's choice or based on fuel economy and emissions benefits. If an emissions reduction is preferred, the powertrain may be preheated and conditioned prior to engine start. Herein, if ambient temperature is higher than the powertrain temperature, the coolant may absorb heat from the ambient and transfer it to the powertrain. On the other hand, if operator comfort is preferred, water condensation may be prevented and the vehicle cabin may be heated. Further, the windshield warming routine may be selected to reduce time spent by the operator in cleaning the windshield.

By transferring existing heat in the ambient to preheat the powertrain, energy consumption to heat the powertrain after an engine start may be decreased. By heating the powertrain before an engine start, engine oil viscosity may be improved, thus reducing parasitic friction losses and engine wear. Alternatively, by conveying heat from the ambient to the windshield and other windows within the cabin greenhouse, the expenditure of energy to clear condensation, and frost build up, after an engine start may be reduced. Overall, by preheating the powertrain and/or the windshield, fuel economy benefits may be combined with a savings in operator time.

In one representation, a method for a vehicle comprises following vehicle shut down, heating a windshield via coolant warmed by circulation across a powertrain when a temperature of the powertrain is higher than a windshield temperature, and when the powertrain temperature is lower than the windshield temperature and ambient temperature is higher than the windshield temperature, heating the windshield via coolant warmed by ambient air by circulating the coolant through a radiator and operating an electric radiator fan.

In another representation, a method for a vehicle in a shutdown condition includes following the vehicle shut down, and prior to an engine start, monitoring a powertrain temperature and ambient temperature periodically, and during a first condition, circulating coolant through a radiator and across a powertrain, and during a second condition, blocking flow of coolant through the radiator and across the powertrain. The first condition includes a condition when the ambient temperature is higher than the powertrain temperature by at least a threshold value. The second condition includes a condition when the ambient temperature is equal to or lower than the powertrain temperature.

Note that the example control and estimation routines included herein can be used with various engine and/or vehicle system configurations. The control methods and routines disclosed herein may be stored as executable instructions in non-transitory memory. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system.

It will be appreciated that the configurations and routines disclosed herein are exemplary in nature, and that these specific embodiments are not to be considered in a limiting sense, because numerous variations are possible. For example, the above technology can be applied to various HVAC system configurations. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for a vehicle comprising:
prior to an engine start and when a temperature of a powertrain of the vehicle is lower than external ambient temperature:
heating a coolant by circulating the coolant through a radiator and operating an electric radiator fan to draw warmer external ambient air through the radiator; and
flowing the coolant through the powertrain.

2. The method of claim 1, wherein the coolant is heated when the powertrain temperature is lower than the ambient temperature by at least a threshold value.

3. The method of claim 2, further comprising disabling coolant heating and circulation when a difference between the powertrain temperature and the ambient temperature is below the threshold value.

4. The method of claim 1, wherein heating the coolant further comprises heating the coolant in response to a command from an operator via a remote computing device.

5. The method of claim 1, further comprising circulating the coolant by activating an electric coolant pump and an electric thermostat.

6. The method of claim 1, further comprising disabling coolant circulation when a battery charge falls below a threshold.

7. The method of claim 1, wherein prior to the engine start further comprises an engine of the vehicle being at rest and the vehicle being in a parked condition.

8. A system for a vehicle comprising:
a powertrain including an engine and a transmission;
a cooling system including a coolant, a radiator, an electric radiator fan, an electric thermostat, and an electric coolant pump; and
a controller having executable instructions stored in a non-transitory memory for, while the vehicle is shut down with the engine at rest and prior to an engine start, if a temperature of the powertrain is lower than external ambient temperature:
heating the powertrain via the coolant, the coolant receiving heat from ambient air by circulating the coolant through the radiator and operating the electric radiator fan to draw warmer external ambient air through the radiator.

9. The system of claim 8, wherein the controller is further configured to automatically activate at regular intervals while the vehicle is shut down in order to measure the powertrain temperature and the ambient temperature and heat the powertrain via the coolant if powertrain temperature is lower than ambient temperature.

10. The system of claim 8, wherein the controller includes further instructions for heating the coolant by activating the electric coolant pump and the electric thermostat, and circulating the coolant through the radiator via the electric coolant pump while operating the electric radiator fan.

11. The system of claim 10, wherein the controller includes further instructions for activating the electric coolant pump and electric thermostat, and circulating the coolant only when the powertrain temperature is lower than the ambient temperature by at least a threshold value.

12. The system of claim 11, wherein the controller includes further instructions for, when a difference between the powertrain temperature and the ambient temperature is less than the threshold value, disabling coolant circulation by deactivating the electric radiator fan, the electric coolant pump, and the electric thermostat.

13. The system of claim 8, wherein the controller includes further instructions for receiving an activation command from an operator via a remote computing device, the activation command configured to activate the controller while the vehicle is shut down in order to measure the powertrain temperature and the ambient temperature and heat the powertrain via the coolant if powertrain temperature is lower than ambient temperature.

14. A method for a vehicle, comprising:
receiving, from a remote computing device, an indication of a predetermined time that an operator intends to start the vehicle; and
prior to the predetermined time and while the vehicle is not operating, transferring heat from external ambient to a selected vehicle component; wherein transferring heat from external ambient to the selected vehicle component comprises activating an electric coolant pump and an electric radiator fan and opening an electric thermostat to transfer heat from external ambient to coolant and transferring heat from the coolant to the selected vehicle component.

15. The method of claim 14, wherein the selected vehicle component comprises one or more of a powertrain, windshield, and cabin of the vehicle.

16. The method of claim 14, wherein transferring of heat from ambient to the selected vehicle component is performed only if ambient temperature is greater than a temperature of the selected vehicle component by more than a threshold amount.

17. The method of claim 14, further comprising disabling transferring heat from ambient to the selected vehicle component when a battery charge is lower than a threshold.

18. The method of claim 14, wherein receiving the indication of the predetermined time when the operator intends to start the vehicle comprises receiving a schedule of a plurality of predetermined times the operator intends to start the vehicle.

* * * * *